3,011,979
PREPARATION OF FINELY-DIVIDED METAL
DISPERSIONS IN FLUIDS
Paul F. Warner, Phillips, Tex., assignor to Phillips
Petroleum Company, a corporation of Delaware
Filed Apr. 24, 1959, Ser. No. 808,768
10 Claims. (Cl. 252—359)

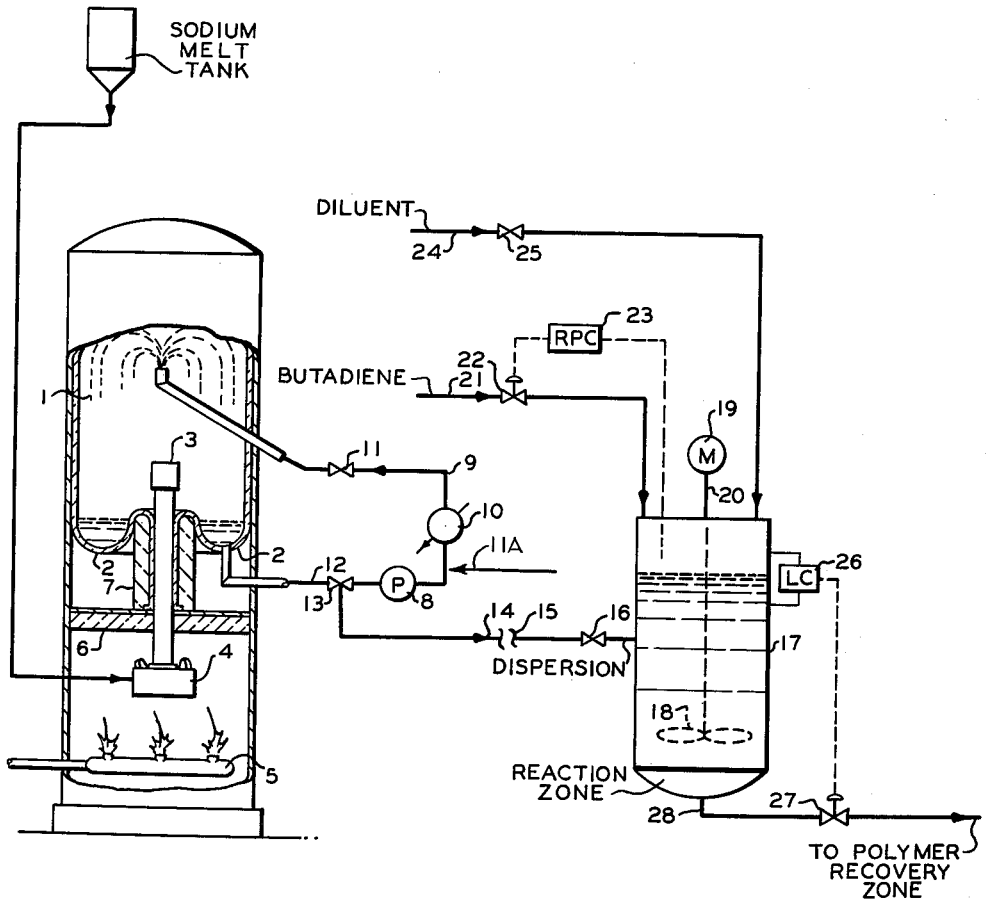

This invention relates to the preparation of finely-divided metal dispersions in fluids. In one of its aspects, the invention relates to preparation of a finely-divided metal dispersion, such as finely-divided sodium, in a fluid. In another of its aspects, the invention relates to the preparation of a dispersion of finely-divided metal in a liquid, for example, a hydrocarbon liquid. In a further aspect of the invention, it relates to the preparation of dispersions as herein described by vaporizing the metal to be dispersed and then condensing the metal vapor into a fluid contacted therewith, the fluid being maintained at a temperature below the condensing temperature of the vaporous metal. In a still further aspect of the invention, it relates to the preparation of a dispersion as herein described by vaporizing the metal to be dispersed upwardly into a vapor space, contacting the vaporous metal in said vapor space with a liquid maintained at a temperature below the condensing temperature of the metal vapors and recovering from a low point a dispersion of said metal in said liquid. In a further aspect of the invention, it relates to a chemical operation in which a reaction is effected in the presence of finely-divided metal dispersed in a liquid which is present during said reaction which comprises passing said liquid into a zone containing said metal in vaporous form, while maintaining said liquid at a temperature below the condensing temperature of said metal vapor under the conditions of said zone, in said zone causing contact of said liquid and metal vapors thus obtaining in said zone a finely-divided dispersion of said metal in said liquid, and passing said dispersion from said zone to said reaction. In a further aspect of the invention, it relates to apparatus for the preparation of a finely-divided metal dispersed in a non-solvent fluid medium for said metal, the apparatus comprising container means for containing said metal in vaporous state, means for passing fluid medium at a temperature below the vaporization temperature of the metal into said container, means for removing condensed, finely-divided metal dispersed in said medium from said container and means for collecting and receiving said metal dispersed in said medium. Various forms and embodiments of the method and apparatus according to the present invention are later described.

In the preparation of certain products employing a metal dispersed in a fluid, for example, in the preparation of a resin by the polymerization of a diolefin, for example, butadiene, using a sodium catalyst consisting essentially of finely-divided sodium dispersed in a hydrocarbon fraction, for example, a fraction boiling in the approximate range 300 to 500° F., there is experienced attrition of the pump which is employed as well as line plugging of the lines which are employed. Also, there are employed high speed stirrers or high pressure pumps to attain velocities at which mixtures of the metal and a desired carrier fluid or liquid can be formed into the desired dispersions. Thus, in one operation which is disclosed in the art, a metal which is in sub-divided form is admixed with a liquid, the mixture thus obtained is heated and passed at high velocity through an elongated zone in which a dispersion is obtained. It will be obvious to those skilled in the art that various problems of attrition, plugging, etc. can be encountered and are encountered under such conditions of operation.

It has now been found that metal dispersions, such as sodium dispersion, in, say, kerosene or heptane or an isoparaffinic fraction boiling in the range 300–500° F., known in the trade as Soltrol, can be prepared simply by vaporization of the metal followed by condensation of the metal vapors into the cold hydrocarbon or other fluid or liquid which may be employed.

It is an object of the invention to prepare dispersions of a finely-divided metal in a non-solvent fluid medium adapted to preserve said metal. It is a further object of this invention to provide a method for the preparation of sodium dispersions. It is a further object of this invention to provide apparatus for the preparation of a finely-divided metal dispersed in a fluid or liquid adapted to preserve the same. It is a further object of this invention to provide a method of operation wherein a chemical conversion is accomplished in which a reaction is effected in the presence of a finely-divided metal dispersed in a liquid in which the liquid is used to prepare said dispersion.

Other aspects, objects and the several advantages of the invention are apparent from a study of this disclosure, the drawing and the appended claims.

According to the invention, there is provided a method of forming a dispersion of a metal in a liquid adapted to preserve said metal in finely-divided form which comprises vaporizing said metal, then contacting said metal with said liquid maintained at a temperature below the vaporization temperature of said metal and recovering a dispersion of said metal, thus formed.

Also according to the present invention, there is provided an apparatus for the preparation of a finely-divided metal dispersed in a non-solvent fluid medium for said metal which comprises container means for containing said metal in vaporous state, means for passing fluid medium at a temperature below the vaporization temperature of the metal into said container, means for removing condensed, finely-divided metal dispersed in said medium from said container and means for collecting and receiving said metal dispersed in said medium.

Using an apparatus, the essence of which appears in the drawing, small pieces of sodium contained in a pipe nipple were vaporized with heat from a Fisher burner. The vapors were collected in cold Soltrol, an isoparaffinic hydrocarbon fraction prepared by the alkylation of an isoparaffin with an olefin employing a hydrofluoric acid catalyst and having a boiling range of from 300 to 500° F. Microscopic examination of the dispersion thus produced showed the particles to be spongy and irregular shaped and having a particle diameter of the order of 1 to 5 microns.

Referring now to the drawing, 1 is an inverted flask shaped at 2 to provide a peripheral or annular channel. Three (3) is the upper end of a sodium vaporizer tube containing molten sodium metal at a point designated as 4, the molten metal having been fed from the sodium melt tank. Heat from gas burner 5 vaporizes the sodium which rises upwardly through the tube and passes out from the tube into flask 1. Six (6) is an insulative or protective screen which prevents heat from the gas burner from rising to and heating flask 1. Additional insulation 7 is provided around pipe 3 to prevent premature condensing of sodium vapor therein. Pump 8 pumps Soltrol by way of pipe 9 and cooler 10 through valve 11 into the uppermost portion of flask 1. Make-up Soltrol enters the system through pipe 11A. In flask 1, the cold Soltrol intimately admixes with the sodium metal vapors in the flask. Finely-divided sodium metal dispersion in Soltrol, as described herein, is collected in channel 2 and removed from flask 1 by way of pipe 12. A portion or all of the dispersion thus produced can be removed by way of valve 13 and pipe 14 to a receiver. Or, if desired, a portion or all of the removed dispersion can be cycled directly to a conversion operation. Indeed, according to the present invention, it is within the scope thereof and the appended claims thereto to take a liquid which is present during a chemical reaction and to pass this liquid to an apparatus, as here described, to prepare the dispersion and to take the dispersion thus produced back to the reaction mass. It will be evident to one skilled in the art in possession of this disclosure and having studied the same that it is within the scope of the invention, as a modification thereof, to continue to cycle the same or substantially the same quantity of Soltrol, or equivalent fluid or liquid medium, through flask 1 until there is built up in the medium a sufficient or desired quantity of dispersed sodium.

There is also shown in the drawing a butadiene polymerization zone as a receiver for the dispersion prepared according to the present invention. Break 15 and pipe 14 indicate a change of scale since obviously the reaction zone about to be described usually will be much larger by comparison with the apparatus already described. Dispersion passes by way of pipe 15 and valve 16 into reaction 17 equipped with a stirrer 18 run by motor 19 by way of shaft 20. Butadiene is fed by way of pipe 21, recorder-pressure-controlled valve 22, controlled by controller 23, to reactor 17. Diluent which in this case is substantially the same Soltrol which is used to prepare the dispersion is added by way of pipe 24 equipped with valve 25. Liquid level controller 26 controls valve 27 in polymer outlet pipe 28. The conditions of operation for butadiene polymerization are well known in the art and can be supplied by one skilled in the art and are, therefore, not here described. In this connection, reference is made to U.S. Patent 2,631,175 issued March 10, 1953 to W. W. Crouch.

It is within the scope of the invention, instead of using a separate vaporizer tube, to construct the vaporizer tube and condensing container or vessel as one integral piece. It is also within the scope of the invention, as a modification thereof, to differently arrange the various portions of apparatus which have been described. It is essential only that the sodium vapor be contacted intimately by the liquid or fluid and that the liquid or fluid take up the vapor condensing the same therein to form the particles of the order of micron size herein stated.

Although the drawing has been described giving sodium as a specific example, it will be obvious that potassium and other metal vapors can be condensed to form dispersions thereof, using the method and/or apparatus of the invention.

Although Soltrol is now preferred as the liquid medium which is employed in preparing the metal dispersion of the invention, other media, such as kerosene or other hydrocarbons or compounds known in the art for such purposes as the preservation of sodium metal, can be used. It is essential only that the medium be non-reactive with the metal.

This invention possesses particular utility in the preparation of sodium catalyst dispersions which are presently used in polymerizations of compounds, such as diolefins, for example, butadiene, in the preparation of drying oils, resins, etc.

Reasonable variation and modification are possible within the scope of the foregoing disclosure, the drawing and the appended claims to the invention, the essence of which is that there have been provided a method and apparatus for the preparation of dispersions of finely-divided metal, the method comprising vaporizing metal, for example, sodium, and collecting and condensing the metal vapor in a liquid or fluid medium kept below the condensing temperature of the metal vapor; the apparatus comprising essentially a container into which the metal is vaporized, means for vaporizing the metal into said container and means for passing the liquid or fluid through said container at a temperature below the condensing temperature of the metal vapor whereby to cause the metal vapor to condense into the fluid or liquid as discrete particles having sizes of the order of a few microns.

I claim:
1. An apparatus for the preparation of a finely-divided metal dispersed in a non-solvent fluid medium for said metal which comprises container means for containing said metal in vaporous state, means located below said container for vaporizing said metal upwardly into a lower section of said container, means for passing fluid medium at a temperature below the vaporization temperature of the metal into an upper section of said container as a subdivided stream blanketing the upper section thereof, means for insulating against passage of heat from said means for vaporizing said metal to said container, means in said container for collecting and receiving said metal dispersed in said medium, and means for removing condensed, finely-divided metal dispersed in said medium from said container.

2. An apparatus for the preparation of a finely-divided metal dispersed in a non-solvent fluid medium for said metal which comprises container means for containing said metal in vaporous state, means to contain unvaporized metal in communication with a lower section of said container means for containing said metal in vaporous state, means located below said container for vaporizing said metal upwardly into a lower section of said container from said means to contain unvaporized metal, means for passing fluid medium at a temperature below the vaporization temperature of the metal into said container as a spray blanketing the upper section thereof, means for insulating against passage of heat from said means for vaporizing said metal to said container, and means for receiving condensed, finely-divided metal dispersed in said medium from said container.

3. An apparatus for the preparation of a finely-divided metal dispersed in a non-solvent fluid medium for said metal which comprises a vessel for containing vaporized metal, a container in open communication with said vessel adapted to contain unvaporized metal, means located below said vessel for heating said container, means for passing vaporized metal from said container upwardly into said vessel, means for passing a non-solvent liquid into said vessel into contact with said vaporized metal therein, means for cooling said liquid prior to its entry into said vessel, means for removing liquid containing finely-divided, dispersed metal from said vessel, means for cycling removed liquid again into the vessel and means for removing from the apparatus a desired metal-in-liquid dispersion.

4. An apparatus for the preparation of a finely-divided metal dispersed in a non-solvent fluid medium for said metal which comprises a container having an extended conduit-shaped opening smaller than its largest diameter, said container being disposed in an inverted position, a metal vaporizing means below said container having a pipe-shaped discharge extending upwardly into said conduit-shaped opening to a level above the lowest point of the enlarged body of said container as it is disposed in its inverted position, means for heating said metal vaporizing means, means for insulating said container and conduit-shaped opening from heat from said means for heating, means for pumping a fluid into the vapor space in the container above the discharge end of said pipe-shaped discharge, and means for removing collected fluid from a point in said container at a level below said discharge end.

5. In combination, an inverted narrow, elongated-neck flask shaped to provide a peripheral liquid collecting section in said flask in its inverted position, a discharge pipe equipped metal vaporizing container below said flask disposed with its discharge pipe extending upwardly into and through the neck of said flask to a level above said peripheral collecting section, heating means upon said container, means for pumping a liquid into the vapor space in said flask, insulating means for said flask to insulate the same against heat from said heating means, and means for removing accumulated liquid from said section.

6. An apparatus according to claim 5 wherein the neck of said flask is insulated and wherein means are provided to cool said liquid prior to its entry into said vapor space.

7. An apparatus for dispersing into a spray of liquid which is a non-solvent for the same, a vaporized metal which comprises a container, means in said container to provide a spray of liquid into the upper portion of said container, means for feeding liquid to said means to provide a spray, a bottom for said container dished at at least a portion thereof, a central opening in the bottom of said container formed as a pipe extending a substantial distance below said bottom of said container, said pipe also extending upwardly a substantial distance into said container so that it extends above the inner periphery of said dished bottom, means between the inner wall of said dished bottom and the wall of said pipe to insulate said bottom at its inner wall from heat which may be radiated from said pipe, means for vaporizing a metal in open communication with said pipe at a point below the bottom of said container, means for heating said means for vaporizing, means for recovering metal dispersion formed in said container from the dished portion of the bottom thereof, means for shielding said bottom of said container and said means for removing from heat from said means for vaporizing and means for supplying heat to said means for vaporizing.

8. An apparatus for dispersing into a spray of liquid which is a non-solvent for the same, a vaporized metal which comprises a container, means in said container to provide a spray of liquid into the upper portion of said container, means for feeding liquid to said means to provide a spray, a peripherally-dished annular shaped bottom for said container, a central opening in the bottom of said container formed as a pipe extending a substantial distance below said bottom of said container, said pipe also extending upwardly a substantial distance into said container so that it extends above the inner periphery of said dished annular-shaped bottom, means between the inner wall of said peripherally-dished annular-shaped bottom and the wall of said pipe to insulate said peripherally-dished annular-shaped bottom and its inner wall from heat which may be radiated from said pipe, means for vaporizing a metal in open communication with said pipe at a point below the bottom of said container, means for heating said means for vaporizing, means for recovering metal dispersion formed in said container from the dished bottom thereof, means for shielding said bottom of said container, and said means for removing from heat from said means for vaporizing and means for supplying heat to said means for vaporizing.

9. An apparatus according to claim 8 wherein means are provided for supplying dispersion of the metal in liquid which is removed from the bottom of said container to said means to provide a spray.

10. An apparatus according to claim 9 wherein there is also provided a means for cooling said dispersion before it is supplied to said means to provide a spray.

References Cited in the file of this patent

UNITED STATES PATENTS

| 1,647,446 | Wolcott | Nov. 1, 1927 |
| 2,631,175 | Crouch | Mar. 10, 1953 |

OTHER REFERENCES

Sittig: "Sodium, Its Manufacture, Properties and Uses," published by Reinhold Publishing Corp., New York, 1956, pp. 133–42.